(No Model.)
E. CONE.
TROLLEY FOR ELECTRIC RAILWAY CARS.
No. 596,456. Patented Dec. 28, 1897.
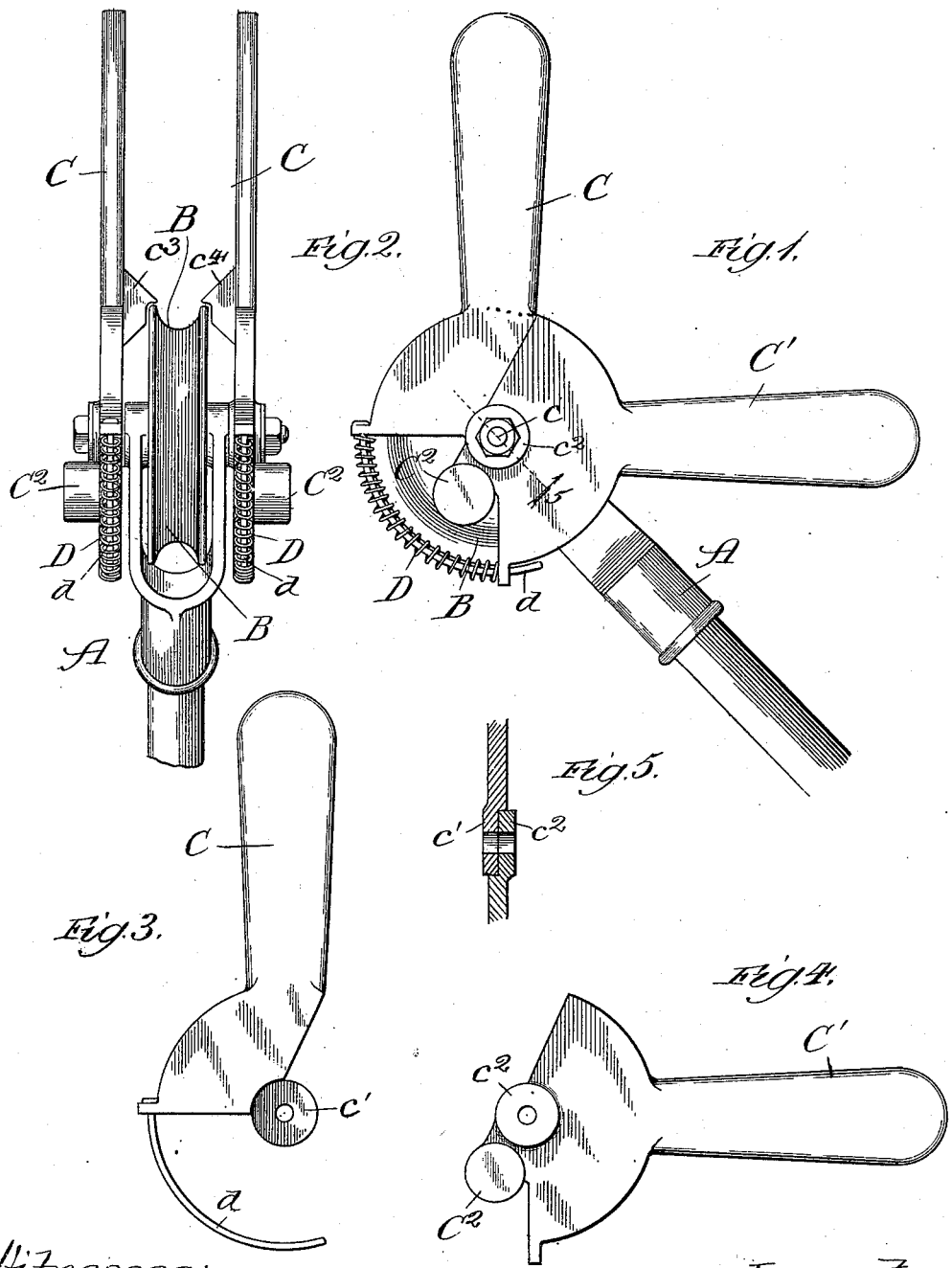

UNITED STATES PATENT OFFICE.

EDWARD CONE, OF CHICAGO, ILLINOIS, ASSIGNOR OF ONE-THIRD TO RUDOLPH G. MEYER, OF SAME PLACE.

TROLLEY FOR ELECTRIC-RAILWAY CARS.

SPECIFICATION forming part of Letters Patent No. 596,456, dated December 28, 1897.

Application filed December 11, 1896. Serial No. 615,256. (No model.)

*To all whom it may concern:*

Be it known that I, EDWARD CONE, a citizen of the United States, residing at Chicago, in the county of Cook and State of Illinois, have invented certain new and useful Improvements in Trolleys for Electric-Railway Cars, of which the following is a specification.

My invention relates particularly to the means for preventing the trolley from jumping the wire, and has for its object the providing of simple, economical, and efficient guard mechanism for a trolley-wheel.

The invention consists in the features, combinations, and details of construction hereinafter described and claimed.

In the accompanying drawings, Figure 1 is a side elevation of the upper portion of a trolley-pole, showing my improvements in operative position; Fig. 2, an end view of the mechanism shown in Fig. 1. Figs. 3 and 4 are side elevations of the guard mechanism removed from the pole; and Fig. 5 is a sectional view of the guard-joints, taken on the line 5 of Fig. 1.

In the art to which this invention relates it is well known that the trolley is apt to jump or leave the wire whenever the motion of the car is irregular and whenever the trolley passes under a bridge or stay-wires. This is objectionable, owing to the fact that the current is shut off sometimes at points where it is extremely dangerous for the car, and, further, because there is a loss of time due to the attempt to place the trolley again on the wire. The primary object, therefore, of my invention is to provide a simple mechanism that will obviate these objections and keep the trolley at all times, when desired, in engagement with the trolley-wire.

In illustrating and describing my improvements I will only illustrate and describe that portion which I consider to be new, leaving out of consideration so much of the mechanisms that are old and which are not necessary to fully disclose my invention and enable those skilled in the art to practice the same.

In constructing my improvements I use a trolley-pole A of the desired size and shape and provide it with a trolley-wheel B, which is rotatably mounted on the same at the upper end.

In order to keep the trolley-wheel in engagement with the wire at all times, I provide each side of the wheel with guards $C$ $C'$. These guards are preferably made so as to resemble two wings and are pivotally mounted on the axle $c$, upon which the trolley-wheel rotates. As shown in Figs. 3, 4, and 5, these guards are provided with what is known as a "rule-joint" $c'$ $c^2$, and one of such guards is provided with a weight $C^2$, that acts to balance the parts and preferably keep but one of the wings C in the vertical position while the other one is mounted in substantially a horizontal plane. The guards are kept in their closed position by means of a helical coiled spring D, that is mounted upon a segmental rod $d$. The inner sides of the guards are provided with angle-pieces $c^3$ and $c^4$, that incline toward the groove of the trolley-wheel, so that should the trolley leave the wire the wire will contact the incline of either one of these angle-pieces and be forced back into the groove of the trolley-wheel.

In operation, supposing the trolley and its wheel to be in engagement with wire and approach a bridge, the wings C contact with the bridge at its lateral edge and force the wings C up against the lower portion thereof, the pivot and spring mechanism permitting a separation of the parts. As soon as the opposite end of the bridge is reached the tension of the springs forces the wings $C'$ upwardly and prevent the trolley from jumping the wire. As soon as the trolley has passed out of all contact with the bridge the parts resume the normal position shown in Figs. 1 and 2.

While I have described my invention with more or less minuteness as regards details and as being embodied in certain precise forms, I do not desire to be limited unduly or any more than is pointed out in the claims. On the contrary, I contemplate all proper changes in form, construction, and arrangement, the omission of immaterial elements, and the substitution of equivalents as circumstances may suggest or necessity render expedient.

I claim—

1. In mechanisms of the class described, the combination of a trolley-pole provided with a rotatable trolley-wheel at the upper end thereof, substantially V-shaped guards at each side of the trolley-wheel and means for holding one of the wings of the substantially V-shaped guards in substantially vertical position, above the surface of the trolley-wheel, substantially as described.

2. In mechanisms of the class described, the combination of a trolley-pole provided with a rotatable trolley-wheel at the upper end thereof, guard mechanism pivotally mounted at each side of the trolley-wheel and having substantially vertical and horizontal portions independently and pivotally mounted, means for normally holding such portions in their vertical and horizontal positions, and spring mechanism for keeping them in their closed position and permitting a separation of the parts when obstructions are met, substantially as described.

3. In mechanisms of the class described, the combination of a trolley-pole provided with a rotatable trolley-wheel at the upper end thereof, guard mechanism pivotally mounted at each side of the trolley-wheel and made in two portions independently and pivotally mounted, one portion being held in a vertical position and the other in a horizontal position, a weight for normally holding the parts in such positions, helical coiled springs to hold the parts in their closed position, permit a separation thereof and force, at certain times, the horizontal part into a vertical position, or substantially so, and inclined lugs on the inner surface of the guard mechanism to assist in returning the trolley-wire into engagement with the trolley-wheel, substantially as described.

EDWARD CONE.

Witnesses:
   THOMAS A. BANNING,
   THOMAS B. MCGREGOR.